(12) United States Patent
Ban

(10) Patent No.: US 7,436,786 B2
(45) Date of Patent: Oct. 14, 2008

(54) TELECOMMUNICATIONS SYSTEM FOR MINIMIZING THE EFFECT OF WHITE NOISE DATA PACKETS FOR THE GENERATION OF REQUIRED WHITE NOISE ON TRANSMISSION CHANNEL UTILIZATION

(75) Inventor: Oliver Keren Ban, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 983 days.

(21) Appl. No.: 10/730,955

(22) Filed: Dec. 9, 2003

(65) Prior Publication Data

US 2005/0122961 A1    Jun. 9, 2005

(51) Int. Cl.
*H04B 1/44* (2006.01)

(52) U.S. Cl. .................. 370/282; 370/201; 379/392.01; 704/226; 704/227; 704/228

(58) Field of Classification Search .................. 370/201, 370/282; 379/392.01; 704/226–228
See application file for complete search history.

(56) References Cited

U.S. PATENT DOCUMENTS

| | | | | |
|---|---|---|---|---|
| 5,912,923 A | * | 6/1999 | Hellwig et al. .............. | 375/254 |
| 5,953,666 A | * | 9/1999 | Lehtimaki ................... | 455/439 |
| 6,249,180 B1 | * | 6/2001 | Maalej et al. ............... | 329/304 |
| 6,708,147 B2 | * | 3/2004 | Mekuria et al. ............. | 704/228 |
| 2003/0078767 A1 | * | 4/2003 | Nayak ......................... | 704/200 |
| 2004/0258132 A1 | * | 12/2004 | Hong .......................... | 375/130 |

* cited by examiner

*Primary Examiner*—Hemant S. Patel
(74) *Attorney, Agent, or Firm*—Julius B. Kraft; Mark E. McBurney

(57) ABSTRACT

Minimizing the effects of the requisite AGWN packets on transmission channel utilization without diminishing any of the aesthetic quality of the AGWN white noise on the voice or audio communication. A system for minimizing the effect of required generated background noise on said transmission channel utilization comprising the combination of an implementation for forming a transmission stream of sequential digital audio data packets, associating with each audio packet a data code representation of the payload data packet enabling the generation of said background noise and an implementation at a receiving station, responsive to each of said data representations for forming the represented payload data packet enabling said generation of background noise together with means at said receiving station for interspersing said formed payload packets enabling background noise generation between said associated audio data packets and background noise generating means, at said receiving station, responsive to said enabling payload packets for generating the background noise between the audio data packets.

4 Claims, 4 Drawing Sheets

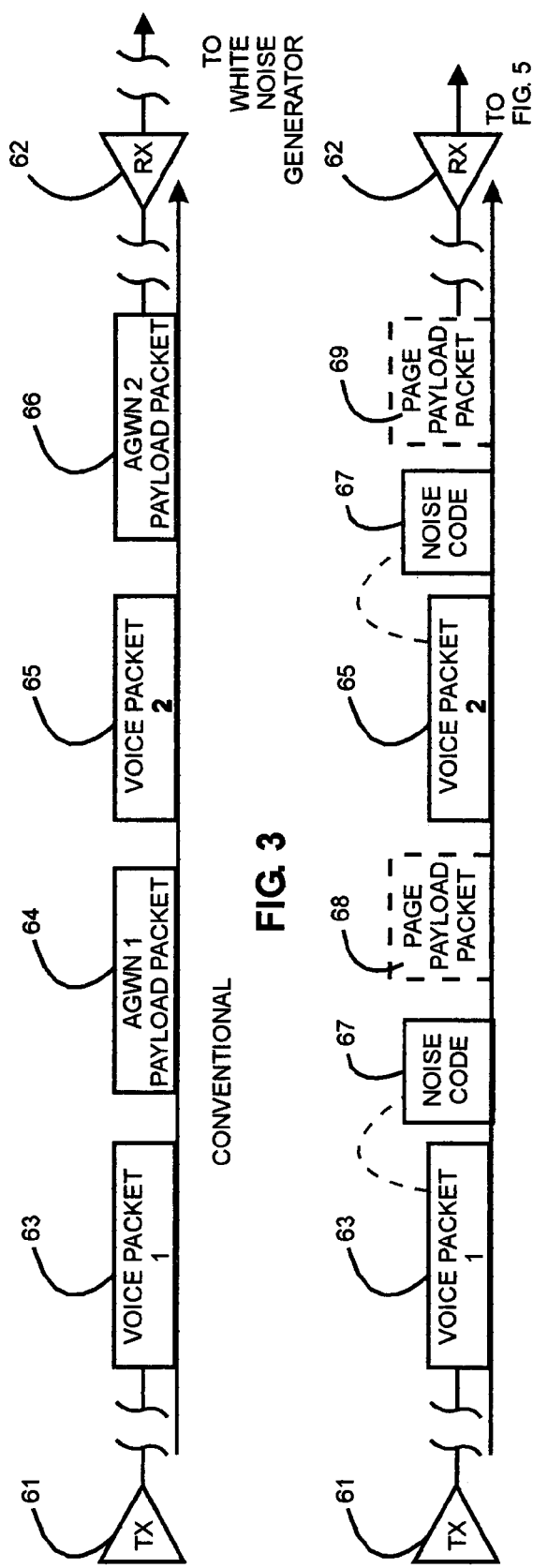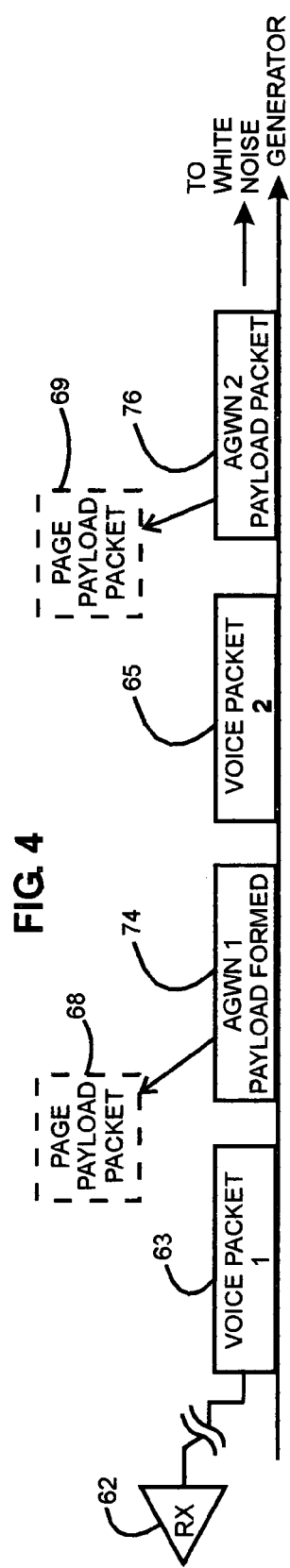

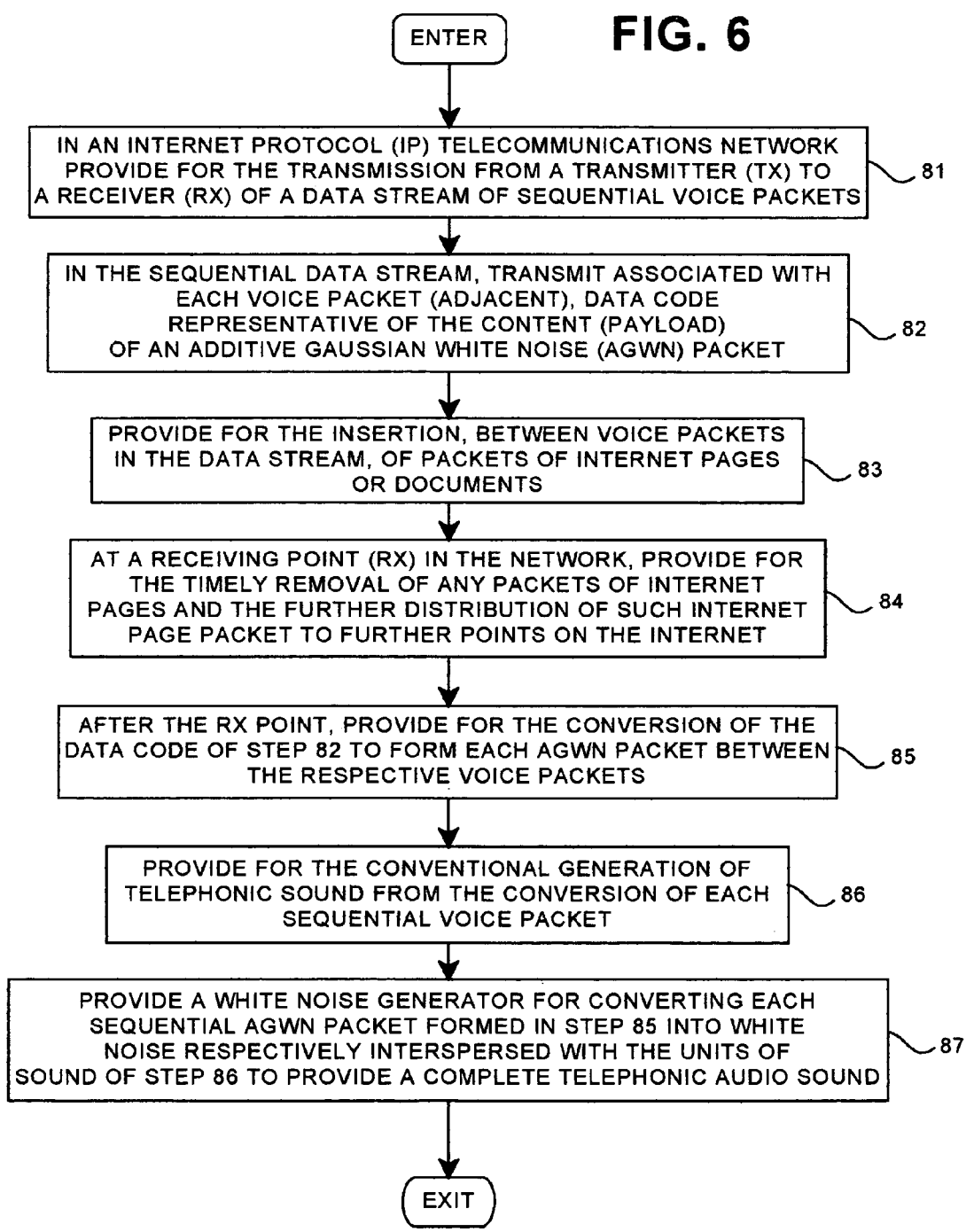

TELECOMMUNICATIONS SYSTEM FOR MINIMIZING THE EFFECT OF WHITE NOISE DATA PACKETS FOR THE GENERATION OF REQUIRED WHITE NOISE ON TRANSMISSION CHANNEL UTILIZATION

TECHNICAL FIELD

The present invention relates to telecommunications systems and particularly to systems for generating white noise required for audio or voice telecommunications.

BACKGROUND OF RELATED ART

With the globalization of business, industry and trade wherein transactions and activities within these fields have been changing from localized organizations to diverse transactions over the face of the world, the telecommunications industries have, accordingly, been expanding rapidly. While telecommunications technology development has been advancing to keep pace with expanded demands, communication channel bandwidth remains a relatively costly commodity. Bandwidth is the amount of data that can be transmitted via a given communications channel in a given unit of time (generally one second). Channel and bandwidth shortages still remain the factors that limit the full effectiveness of long distance telecommunications; particularly the cost of long range mobile telecommunications. Because of the rapid expansion of industry and commerce telecommunication bandwidth needs over the past decade, the telecommunications industry has been rapidly expanding the worldwide infrastructure needed to satisfy these needs.

One area has been that of Internet Protocol (IP) Telecommunications wherein voice and other audio telecommunications are transmitted over the Internet. In such IP telephonic communications, as well as in most of the conventional wired and wireless Public Service Telephone Network (PSTN) communications, voice communication is broken down into voice packets that are digitized and transmitted over either the traditional PSTN or over the Internet using IP telecommunication Protocols. The text, *IP Telephony Demystified*, Ken Camp, published 2003, McGraw-Hill, New York, N.Y., describes such transmission of voice packets, particularly in Chapter three, pp. 54-69. These voice packets are generally transmitted by forward packet switching wherein the voice packets are switched at nodes where such packets are stored in queues until spaces in transmission streams arrive at the node to accept the voice packet. Such packet switched telecommunications are quite concerned with the quality of the telephone call. One conventional way to maintain quality of the voice transmission, even during silent periods, is to maintain a level background noise known as white noise. In order to maintain such background white noise, the technology has been interspersing white noise generating packets between transmitted voice packets. These white noise packets contain data for driving white noise generators maintained at receiving telephone stations for converting the data in the white noise packets into generated noise that is interleaved into the audible telephone signal at times of voice silence between voice packages. The most effective white noise generation is currently being done by the Additive Gaussian White Noise (AGWN) generator described in *Newton's Telecom Dictionary*, 2003, CMP Books, San Francisco, Calif., on page 885; and in more detail in the published article, *Generating Noise in VoIP Designs*, by F Bourget, Octasic System Design, Mar. 3, 2003, http://www.eedesign.com/story/ OEG20030303S0036. While the white noise generated has maintained telephone audible quality, the packets needed for white noise generation, AGWN packets, have become so prevalent in telecommunication channels that channel utilization, i.e. that portion of the transmission channel used for the transmission of data content, has been significantly diminished.

SUMMARY OF THE PRESENT INVENTION

The present invention provides for minimizing the effects of the requisite AGWN packets on transmission channel utilization without any diminishing of the aesthetic quality of the AGWN white noise on the voice or audio communication. To this end, the present invention provides a system for minimizing the effect of required generated background noise on said transmission channel utilization comprising the combination of an implementation for forming a transmission stream of sequential digital audio data packets, means for associating with each audio packet, a data code representation of the payload data packet enabling the generation of said background noise, and an implementation at a receiving station, responsive to each of said data representations for forming the represented payload data packet enabling said generation of background noise together with means at said receiving station for interspersing said formed payload packets enabling background noise generation between said associated audio data packets, and background noise generating means, at said receiving station, responsive to said enabling payload packets for generating the background noise between the audio data packets. In an embodiment, the data code may be as simple as code defining the desired amplitude and duration of each white noise AGWN packet definition. According to one aspect of the invention, the associated data code representations of the payload data packet enabling the generation of said background noise are included in each voice data packet.

In accordance with a significant aspect of this invention, the telecommunications system of claim 4 is an IP telecommunications system; and there are further means for interposing Internet page packets into said transmitted stream whereby said Internet page packets are sequenced in spaces between voice packets conventionally occupied by the AGWN packets.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is an illustration of a transmission channel having a voice packet transmission according to the prior art:

FIG. 4 is an illustration of a transmission channel having a voice packet transmission according to the present invention;

FIG. 5 is an illustration of a voice packet transmission processed at a telecommunication receiving station according to the present invention; and FIG. 6 is a flowchart describing how the telecommunications system of the present invention is set up to minimize the effect of AGWN packets on transmission channel utilization.

DETAILED DESCRIPTION OF THE PREFERRED EMBODIMENT

Figure 1:
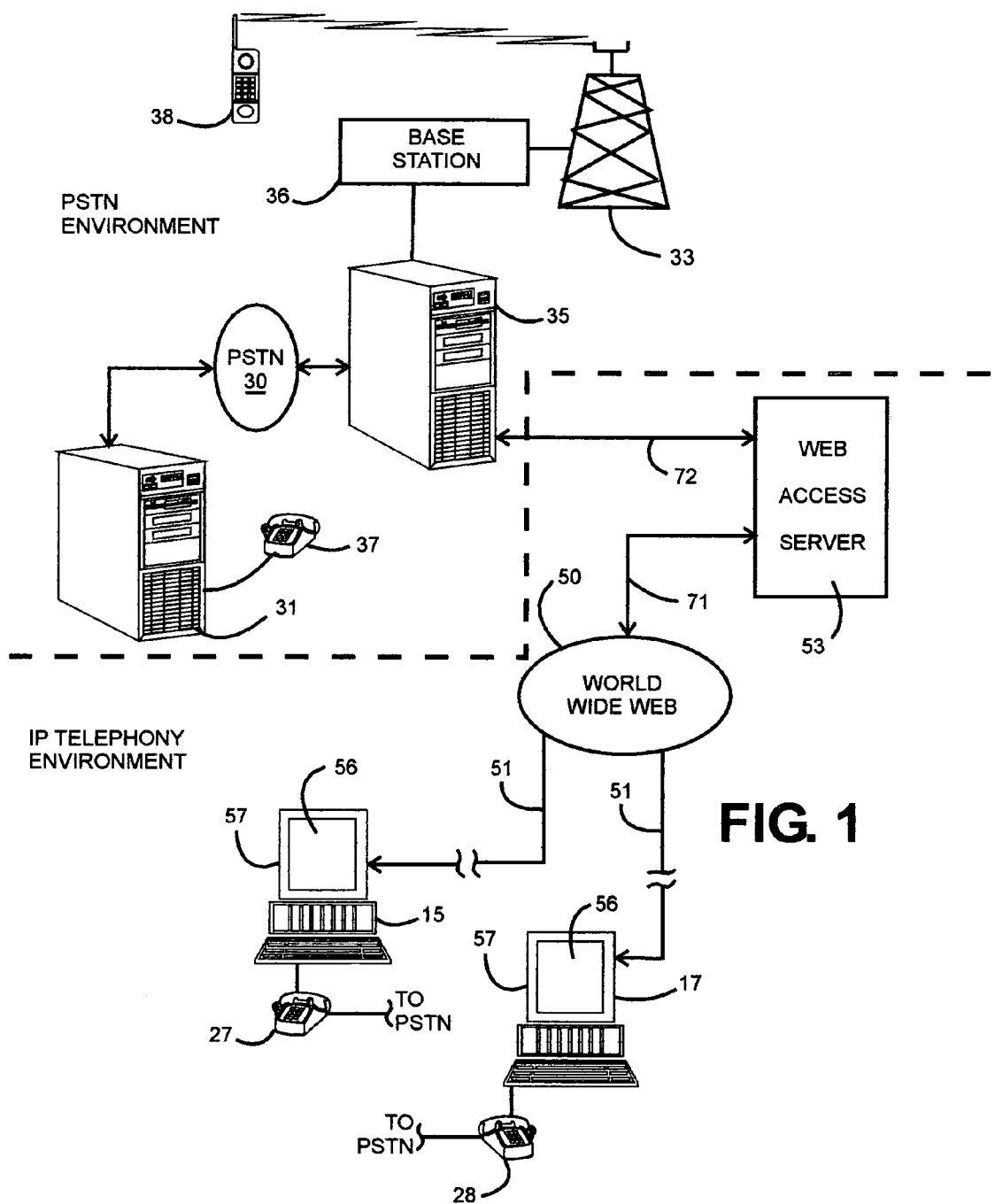
FIG. 1 is a generalized diagrammatic view of a portion of a PSTN gatewayed to an IP Telecommunications network portion on which the present invention may be implemented.

Referring to FIG. 1, there is shown a generalized diagrammatic view of a portion of a PSTN Environment showing channel paths to and from both conventional wired and mobile wireless channels and devices. There is also an interconnected portion of an IP Telephony Environment involving transmissions over the Internet or Web. In the following discussion, it should be understood that the concepts described relate to packet transmission channels respectively within the PSTN Environment, the IP Environment or across both environments connected through an appropriate gateway to be hereinafter described in greater detail. The PSTN network includes channel paths to and from both conventional wired and mobile wireless channels and cellular devices according to the present invention. Let us assume that representative cellular telephone 38 of the many mobile cell phones that are in regions within the range of the cellular area set up as represented by cell tower 33 connected to a cell base station 36 that in turn is connected to switching center 35 that then routes the telecommunications into PSTN 30 to which conventional hardwired telephone stations as represented by telephone 37. While, for convenience in illustration, both wireless mobile telephone 38 and wired telephone 37 are shown as ordinary telephones, it should be understood that these telephone stations are very likely to be computers, connected to the Web 50 through the PSTN connected via 72 to Web Server 53, in turn connected to the Web 50 and thus into the IP environment via connection 71.

Because wireless mobile communications, particularly from handheld or laptop computers is becoming very prevalent in PSTN systems, some background on wireless telecommunication is appropriate at this point. In the widely used cellular system for mobile wireless telecommunications, an area, such as a city, is broken up into small area cells. Each cell is about 10 square miles in area. Each has its base station that has a tower for receiving/transmitting and a base connected into PSTN. Even though a typical carrier is allotted about 800 frequency channels, the creation of the cells permit extensive frequency reuse so that tens of thousands of people in the city can be using their cell phones simultaneously. Cell phone systems are now preferably digital with each cell having over 160 available channels for assignment to users. In a large city there may be hundreds of cells, each with its tower and base station. Because of the number of towers and users per carrier, each carrier has a Mobile Telephone Switching Office (MTSO) that controls all of the base stations in the city or region and controls all of the connections to the land based PSTN. When a client cell phone gets an incoming call, MTSO tries to locate in what cell the client mobile phone is located. The MTSO then assigns a frequency pair for the call to the cell phone. The MTSO then communicates with the client over a control channel to tell the client or user what frequency channels to use. Once the user phone and its respective cell tower are connected, the call is on between the cell phone and tower via two-way long range RF communication. In the United States, cell phones are assigned frequencies in the 824-894 MHz ranges. Since transmissions between the cell telephone and cell tower are digital, but the speaker and microphone in the telephone are analog, the cell telephone has to have a D to A converter from the input to the phone speaker and an A to D converter from the microphone to the output to the cell tower.

Now, with respect to the Web IP Telephony of FIG. 1, environment protocols are described in detail in the above-mentioned text, *IP Telephony Demystified*, particularly in Chapter 4, pp. 97-117. The IP network is customarily connected into the PSTN via a gateway, not specifically shown, but which may be part of the Web Access Server system 53. The *IP Telephony Demystified* text describes several conventional gateways between PSTN and IP telecommunications networks at Chapter 7, pp. 145-156.

Before going further into the details of specific embodiments using the IP network in FIG. 1, it may be helpful to consider the Internet or Web from a more general perspective. For details on Internet nodes, objects and links, reference is made to the text, *Mastering the Internet*, G. H. Cady et al., published by Sybex Inc., Alameda, Calif., 1996. The Internet or Web is a global network of a heterogeneous mix of computer technologies and operating systems. Higher level objects are linked to lower level objects in the hierarchy through a variety of network server computers.

Figure 2:
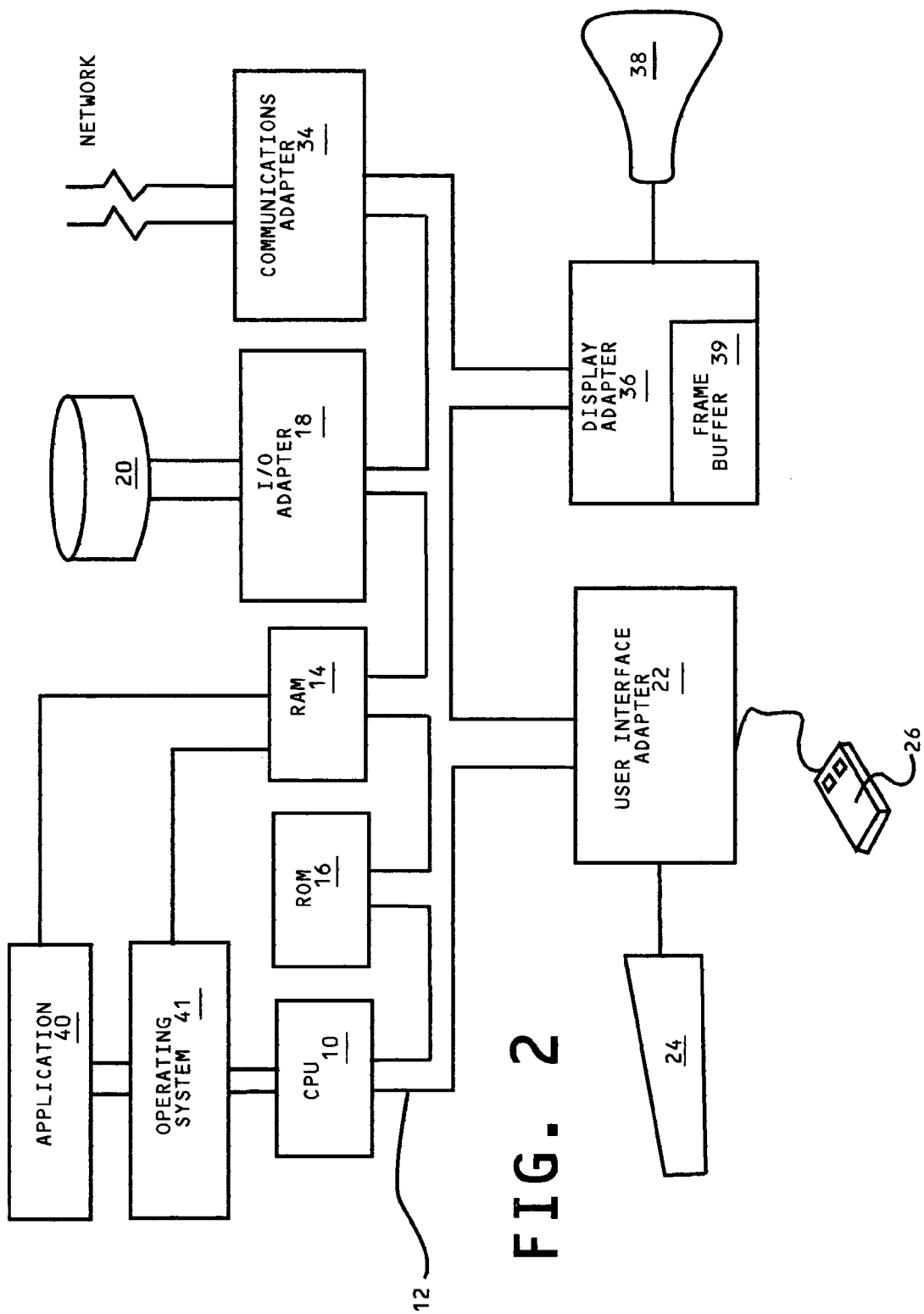
FIG. 2 is a block diagram of a generalized display computer system including a processor unit that may perform the functions of the display computers through which the IP telecommunications may be transmitted (TX) and received (RX)

With respect to the IP network of FIG. 1, the representative telephone stations 27 and 28 may be conventionally wired into the Web 50 as shown. Each telephone station 27-28 has an associated Web network terminal 15 and 17 with displays 57 upon which the screen panels 56 may be displayed. Terminals 15 and 17 may be implemented by the computer system set up to be subsequently described in FIG. 2, and the Network connection in FIG. 2 is the Web connection 51 shown in FIG. 1. For purposes of the present embodiment, terminals 15 and 17 are representative of the Web display stations for respectively supporting and monitoring telephone stations 27-28. Reference may be made to the above-mentioned *Mastering the Internet*, pp. 136-147, for typical connections between local display stations to the Web via network servers; any of which may be used to implement the system on which this invention is used. In addition to the above-described standard dial-in or dial-out, the Web or like browser program associated with computer terminals 15, 17 (to be described in FIG. 2) may be modified with application programs that will dial telephone stations 27 and 28 directly into a PSTN as indicated in FIG. 1.

Referring to FIG. 2, a typical data processing system is shown that may function as the computer controlled network terminals or Web stations 15 and 17, FIG. 1, the telecommunications or for data processing in any Web access server.

A central processing unit (CPU) 10, may be one of the commercial microprocessors in personal computers available from International Business Machines Corporation (IBM) or Dell Corporation; when the system shown is used as a server computer at the Web distribution site to be subsequently described, then a workstation is preferably used, e.g. RISC System/6000™ (RS/6000) series available from IBM. The CPU is interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows XPT™ or Windows2000™, as well as UNIX and other IBM AIX operating systems. Application programs 40, controlled by the system, are moved into and out of the main memory Random Access Memory (RAM) 14. These programs include the programs of the present invention for implementing the modified telecommunication white noise packet and voice packet transmission in accordance with this invention. Any conventional Web browser application program, such as Microsoft's Internet Explorer™, or Lotus Notes™ Personal Web Navigator or Server Web Navigator will be available on terminals 15 and 17 for the voice and white sound packet receiving and sending. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with the outside network enabling the computer system to communicate with other such computers over the Web or Internet. I/O devices are also connected to system bus 12 via user interface adapter 22 and display adapter 36. Keyboard 24 and mouse 26 are all interconnected to bus 12 through user interface adapter 22. It is through such input devices that the user at a receiving station may interactively relate to the Web in order to access Web documents and telecommunication packets. Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

FIG. 3 shows a conventional transmission channel for a packet switched telecommunication in a PSTN environment. TX 61 is the illustrative source of the transmission that includes voice packets 63 and 65, and for each voice packet, a corresponding white noise (AGWN) packet 64, 66 that are referred to as a payload packet because each includes all of the data necessary to drive the AGWN generator apparatus at the receiving RX station of the transmission. It should be noted that for convenience in illustration, the voice packets and their associated AGWN packets are shown in the transmission channel in the sequence in which they would be converted into sound by the telephone receiving system associated with RX 62.

Actually, in packet switching transmission, the packets are not likely to be positioned in sequence in transmission channels. The packets need not even move in the same channel as long as when they reach RX 62 the packets are in the sequence shown so that the appropriate AGWN white noise sequence may be generated between the associated voice generation. This should be understood when the present invention is described with respect to FIGS. 4 and 5. Accordingly, as will be described, the advantage of the present invention is not that the particular AGWN payload packet is directly eliminated from the transmission channel to leave a space into which another packet may be directly inserted. Rather, the advantage is that by eliminating the AGWN packets from the transmission channel, traffic in the channel is substantially reduced to thereby leave space into which a variety of transmitted packets may be inserted.

In the present invention, as shown in FIG. 4, instead of the discrete AGWN packets, a small amount of noise code 67 is transmitted, usually in association with the related voice packet 63, 65. This associated code may actually be directly attached to the voice packet, e.g. a header. The code may merely be sufficient to define the amplitude and duration of the AGWN white noise from which the AGWN packet may be subsequently created at the receiving end RX 62 of the telecommunication, as will be described with respect to FIG. 5. Thus, there is room in the transmission channel for additional packets to be transmitted. In an IP environment, as shown, page payload packets 68 and 69 that are inserted, may be Web document packets being transmitted for any Web distribution function. Now, as illustrated in FIG. 5, at the RX end, where the voice telecommunication voice stream is reassembled by programming that may be implemented in the Web browser at the receiving station. Page payload packets 68 and 69 are removed if they have not previously been removed. Then the full AGWN data (payload) packets 74 and 76 are formed based upon the data defined by the respective codes 67. Now, the voice data stream at the receiver end in FIG. 5 has the same final structure as the conventional voice stream of FIG. 3, and thus, white noise (AGWN) packets 74, 76 are full payload packets including all of the data necessary to drive the AGWN generator apparatus at the receiving RX station of the transmission to insert the white noise of appropriate amplitude and duration between the speech generated from the respective voice packages 63 and 65.

FIG. 6 is a flowchart showing the development of a system according to the present invention for maximizing transmission channel utilization in packet telecommunications. In IP telecommunications, provision is made for the transmission from TX to RX of a data stream of sequential packets, step 81. In this sequential data stream, a protocol is established wherein there is transmitted, in association with each voice packet, data code representative of the content (payload) of an AGWN white noise packet, step 82. Provision is made for the insertion, between voice packets in the data stream in the transmission channel, of packets of Internet pages or documents, step 83. At a receiving point in the network, provision is made for the timely removal of any packets of Internet page packets and for the further distribution of such page packets to further points on the Internet, step 84. At the receiving point of the transmission, provision is made for the conversion of the data code of step 82 to form each AGWN packet between the respective voice packets, step 85. Provision is made for the conventional generation of telephonic sound from the conversion of each sequential voice packet, step 86. Provision is made for a white noise generator for converting each sequential AGWN packet into white noise respectively interspersed with the units of sound of step 86 to provide a complete telephonic audio sound, step 87.

Although certain preferred embodiments have been shown and described, it will be understood that many changes and modifications may be made therein without departing from the scope and intent of the appended claims.

What is claimed is:

1. In a telecommunications system providing communication channels for the transmission of packets of audio data between system stations, a method for minimizing the effect of required generated background noise on the transmission channel utilization comprising:

forming a transmission stream of sequential digital audio data packets;

associating with each audio packet, a data code representation of an Additive Gaussian White Noise (AGWN) payload data packet enabling the generation of said background noise;

forming the represented Additive Gaussian White Noise (AGWN) payload data packet enabling said generation of background noise responsive to the receipt of each of said data representations at a system receiving station;

interspersing said formed Additive Gaussian White Noise (AGWN) payload packets enabling background noise generation between said associated audio data packets at said receiving station; and generating said background noise between said audio data packets, at said receiving station, responsive to said enabling AGWN payload packets.

2. The telecommunication method of claim 1 wherein said audio data packets are voice data packets.

3. The telecommunication method of claim 2 wherein said data code representation includes data representing the duration and amplitude of said AGWN packet.

4. The telecommunications method of claim 1 wherein:
said system is an Internet Protocol (IP) telecommunications system; and
further including the step of interspersing Internet page packets into said transmitted stream whereby said Internet page packets are sequenced in the spaces between voice packets conventionally occupied by AGWN packets.

\* \* \* \* \*